United States Patent
Suganuma et al.

(10) Patent No.: US 6,618,479 B1
(45) Date of Patent: Sep. 9, 2003

(54) ECHO CANCELER

(75) Inventors: Toshiya Suganuma, Fujisawa (JP); Takeshi Kawanobe, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/144,463

(22) Filed: Sep. 1, 1998

(30) Foreign Application Priority Data

Sep. 4, 1997 (JP) .............................................. 9-254105

(51) Int. Cl.[7] .............................................. H04M 9/08
(52) U.S. Cl. .......................... 379/406.01; 379/406.06; 379/406.07; 379/406.8; 379/406.16
(58) Field of Search ........................ 379/402–411, 394, 379/398, 399, 406.01–406.16

(56) References Cited

U.S. PATENT DOCUMENTS

| | | | | |
|---|---|---|---|---|
| 3,903,377 A | * | 9/1975 | Sato | 379/411 |
| 4,144,417 A | | 3/1979 | Oshima et al. | |
| 4,479,036 A | | 10/1984 | Yamamoto et al. | |
| 4,852,161 A | * | 7/1989 | Hagiwara | 379/410 |
| 5,287,406 A | * | 2/1994 | Kakuishi | 379/404 |
| 5,606,550 A | * | 2/1997 | Jangi | |
| 5,661,795 A | * | 8/1997 | Maeda | |
| 5,859,907 A | * | 1/1999 | Kawahara et al. | 379/410 |
| 5,920,834 A | * | 7/1999 | Sih et al. | |
| 6,246,760 B1 | * | 6/2001 | Makino et al. | 370/406 |

FOREIGN PATENT DOCUMENTS

| | | | |
|---|---|---|---|
| EP | 0708537 A | | 4/1996 |
| JP | H1-218131 | * | 8/1989 |
| JP | 04083429 | * | 3/1992 |
| JP | 514242 | | 1/1993 |
| JP | 5218904 | | 8/1993 |
| JP | 9148966 | | 6/1997 |

OTHER PUBLICATIONS

Copy of European Search Report dated Jun. 9, 1999.
Patent Abstracts of Japan vol 16, No. 303 (E–1228), Jul. 1992 and JP 04 083429 (A) Fujitsu Ltd.), Mar. 1992.

* cited by examiner

Primary Examiner—Forester W. Isen
Assistant Examiner—Ramnandan Singh

(57) ABSTRACT

An echo canceler for suppressing an echo of a receive signal contained in a transmit signal directed to a telephone circuit and transferring the transmit signal subjected to echo suppression to the telephone circuit. The echo canceler includes a pseudo echo path for attenuating and delaying the receive signal supplied from the telephone circuit and adding the delayed receive signal to the transmit signal, and an echo cancel circuit for estimating a transfer function of the pseudo echo path on the basis of the receive signal supplied from the telephone circuit and the echo of the receive signal, generating a pseudo echo on the basis of a value of the estimation and the receive signal, subtracting the pseudo echo from the transmit signal passed through the pseudo echo path, and thereby transferring the transmit signal subjected to echo suppression to the telephone circuit.

1 Claim, 5 Drawing Sheets

ECHO CANCELER

BACKGROUND OF THE INVENTION

1. Field of the Invention

The present invention relates to an echo canceler for suppressing an echo of a received signal generated by impedance mismatching in an analog two-wire/four-wire conversion portion of a telephone circuit.

2. Description of the Related Art

By using a conventional echo canceler, it is possible to suppress an echo of a receive signal contained in a transmit signal by estimating a transfer function of an echo path on the basis of the receive signal and the echo of this receive signal, generating a pseudo echo on the basis of the estimated transfer function and the receive signal, and subtracting this estimated echo from the transmit signal.

Furthermore, as for the above described estimation of the transfer function of the echo path, it is possible to estimate the transfer function of the echo path in the case where a signal in the transmit direction is only the echo of the receive signal. In the case where the signal in the transmit direction contains a mixture of the echo of the receive signal and the transmit signal, however, the transfer function of the echo path cannot be estimated.

In the conventional echo canceler, it is determined whether the current state is a double talk state such as a state of mixed presence of the transmit signal and the receive signal, or a state of only the transmit signal. If the current state is the double talk state, the operation for estimating the transfer function is stopped.

Figure 5:
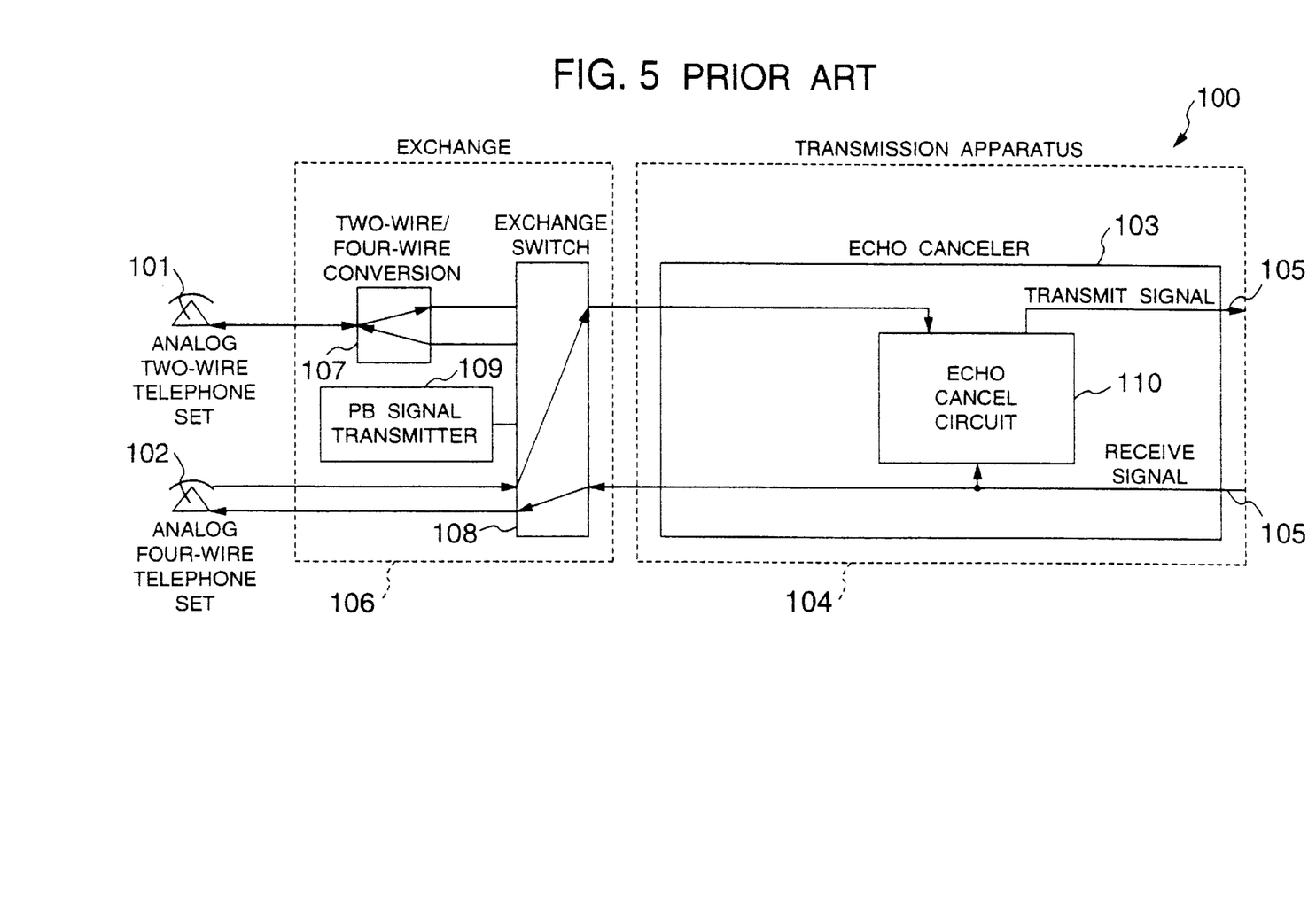
FIG. 5 is a block diagram showing the schematic configuration of the inside of an echo canceler system showing a conventional echo canceler.

FIG. 5 is a block diagram showing the schematic configuration of the inside of an echo canceler system adopting such a conventional echo canceler.

An echo canceler system 100 shown in FIG. 5 includes an analog two-wire telephone set 101, an analog four-wire telephone set 102, a transmission apparatus 104 having an echo canceler 103, and an exchange 106 for conducting exchange and connection for the analog two-wire telephone set 101, the analog four-wire telephone set 102, and telephone circuits 105 via the transmission apparatus 104.

Within this exchange 106, there are included a two-wire/four-wire conversion unit 107 connected to the analog two-wire telephone set 101 to conduct mutual two-wire/four-wire conversion for the transmit and receive signals, an exchange switch 108 for conducting switching connection among the two-wire/four-wire conversion unit 107, the analog four-wire telephone set 102, and the transmission apparatus 104, and a PB (push-button dial) signal transmitter 109 for transmitting a PB signal obtained from the analog two-wire telephone set 101 or the analog four-wire telephone set 102 to a circuit side exchange.

The echo canceler 103 includes an echo cancel circuit 110 for suppressing the echo of the receive signal contained in the transmit signal supplied from the analog two-wire telephone set 101.

In such an echo canceler system 100, it is possible to suppress an echo of a receive signal in the echo cancel circuit 110 by estimating a transfer function of an echo path on the basis of the receive signal of the analog two-wire telephone set 101 and the echo of the receive signal, generating a pseudo echo on the basis of the estimated transfer function and the receive signal, and subtracting the pseudo echo from a transmit signal.

However, the conventional echo canceler 103 has such a configuration that the operation of estimating the transfer function of the echo path is stopped if the current state is judged to be a double talk state. In the case where the transmit signal and the receive signal have similar frequency components, there is a fear that the current state is falsely judged not to be a double talk state although the current state is a double talk state. If in such a double talk state the transfer function of the echo path is estimated, an estimated value is disturbed and the speech quality of the transmit signal is degraded.

In the case where such an echo canceler is applied to a telephone circuit having an echo path, the influence caused by the degradation of the speech quality of the transmit signal is slight even if the current state is falsely judged not to be a double talk state and the transfer function of the echo path is estimated although the current state is the double talk state.

In the case where the echo canceler 103 is applied to a telephone circuit having no echo path, however, the current state is falsely judged not to be the double talk state although the current state is the double talk state. Therefore, the transfer function of the echo path which does not exist is estimated, a pseudo echo is generated, and the pseudo echo is subtracted from a transmit signal. Thus there is a fear that the degradation of the speech quality of the transmit signal may be greatly influenced.

In addition, among kinds of telephone circuits, there are circuits which do not generate echoes such as analog four-wire circuits and digital telephone circuits. In such telephone circuits which do not generate echoes, the echo canceler is not required.

On the side of the transmission apparatus 104 having the echo canceler 103, it is typically impossible to determine whether the kind of the telephone circuit 105 connected to the exchange 106 is a telephone circuit which generates an echo.

In other words, if such a conventional echo canceler 103 is applied to a telephone circuit having no echo path and the current state is a double talk state, then an abnormal rasping noise is added to the transmit signal or the transmit signal is made silent, resulting in a degraded speech quality of the transmit signal, by falsely judging the current state not to be the double talk state, estimating the transfer function of the echo path which does not exist, generating a pseudo echo, and subtracting this pseudo echo from the transmit signal. The conventional echo canceler 103 had such a problem.

When originating a call from the analog two-wire telephone set 101 toward a telephone set of circuit side, the caller of the analog two-wire telephone set 101 unhooks the receiver of the telephone set 101 and obtains the dial tone from the exchange of the circuit side. And the caller presses the dial number of the telephone set of circuit side. In the case where this dial signal system is the PB system, the analog two-wire telephone set 101 of the caller side transmits a PB signal representing dial numbers to the exchange 106. The exchange 106 temporarily stores this PB signal, and transmits the PB signal from the PB signal transmitter 109 included in the exchange 106 to the circuit side exchange via the transmission apparatus 104.

In the case where a call is originated from the analog two-wire telephone set 101 to a circuit-side telephone set, an echo path does not exist when a PB signal is transmitted from the PB signal transmitter 109 because of the analog two-wire telephone set 101. When seen from the conventional echo canceler 103, there occurs a double talk state with a dial tone serving as the receive signal and the PB signal serving as the transmit signal. It is now assumed that the current state is falsely judged in the echo canceler 103 not to be the double talk state in spite of the double talk state. Then the transfer function of the echo path which does not exist is estimated, a pseudo echo is generated, and the pseudo is subtracted from the transmit signal. Therefore, the PB signal for transferring the dial information between exchanges is degraded. Since thus the dial information is not transferred, misconnection or uncompleted connection is caused. The conventional echo canceler had such a problem.

On the other hand, JP-A-5-14242 discloses a method of controlling an echo canceler. This method is aimed to enable comfortable conversation even if the level of a voice signal changes extremely. However, this document does not disclose preventing speech quality degradation due to the false judgment of double talk.

Also, JP-A-5-218904 discloses a method of controlling an echo canceler. This method is aimed to solve the problem that the echo suppression effect is decreased when there exist bi-direction input signals having low frequency components. However, this document also does not disclose preventing speech quality degradation due to the false judgment of double talk.

Further, JP-A-9-148966 discloses an echo canceler in which the judgment of double talk is performed by a nonlinear processor independently from an echo canceling unit. Therefore, even if the judgment of double talk in the echo canceling unit is often changed, the non-linear processor can work stably. However, an echo canceler according to the present invention has a different structure from the echo canceler according to this document.

SUMMARY OF THE INVENTION

In view of the above described problems, the present has been made. A first object of the present invention is to provide an echo canceler capable of being applied to a telephone circuit having no echo path and certainly improving the speech quality degradation of the transmit signal even if the double talk state is caused.

A second object of the present invention is to provide an echo canceler capable of certainly preventing the signal quality of the PB signal from being degraded even if it is used in a double talk state.

An echo canceler according to a first aspect of the present invention is an echo canceler for suppressing an echo of a receive signal contained in a transmit signal directed to a telephone circuit and transferring the transmit signal subjected to echo suppression to the telephone circuit, wherein the echo canceler comprises: a pseudo echo path including attenuation means for attenuating the receive signal supplied from the telephone circuit, delay means for delaying the receive signal attenuated by the attenuation means, and addition means for adding the receive signal delayed by the delay means to the transmit signal; and an echo cancel circuit for estimating a transfer function of the pseudo echo path on the basis of the receive signal supplied from the telephone circuit and the echo of the receive signal, generating a pseudo echo on the basis of a value of the estimation and the receive signal, subtracting the pseudo echo from the transmit signal passed through the pseudo echo path, and thereby transferring the transmit signal subjected to echo suppression to the telephone circuit.

The pseudo echo path is an echo path provided simulatively and includes attenuation means for attenuating the receive signal supplied from the telephone circuit, delay means for delaying the receive signal attenuated by the attenuation means, and addition means for adding the receive signal delayed by the delay means to the transmit signal. Even if the current state is falsely judged not to be a double talk state although the current state is the double talk state, the echo cancel circuit conducts the operation of estimating the transfer function of the pseudo echo path.

This echo cancel circuit estimates a transfer function of the pseudo echo path on the basis of the receive signal supplied from the telephone circuit and the echo of the receive signal, generates a pseudo echo on the basis of a value of the estimation and the receive signal, subtracts the pseudo echo from the transmit signal, and thereby transfers the transmit signal subjected to echo suppression to the telephone circuit.

In the echo canceler according to the first aspect of the present invention, therefore, there is provided the pseudo echo, and the echo canceler estimates the transfer function of the pseudo echo path on the basis of the receive signal obtained from the telephone circuit and the echo of the receive signal, generates a pseudo echo on the basis of a value thus estimated and the receive signal, and subtracts this pseudo echo from the transmit signal. If the echo canceler is applied to a telephone circuit having no echo path and even if the double talk state is caused, therefore, the estimated value of the transfer function of the pseudo echo path is not largely disturbed by false judgment of double talk, because the pseudo echo path is always present. As a result, the speech quality degradation of the transmit signal can be certainly prevented.

An echo canceler according to a second aspect of the present invention is characterized in that, in addition to the configuration of the echo canceler according to the first aspect, the echo canceler comprises: talking determining means for determining whether a usage state of a telephone circuit is a talking state; changeover connection means for conducting changeover connection of the pseudo echo path with the cancel circuit; and control means responsive to judging in the talking determining means the usage state of the telephone circuit to be the talking state, for controlling the changeover connection means so as to connect the pseudo echo path with the echo cancel circuit in order to transfer the transmit signal to the telephone circuit via the echo cancel circuit.

The talking determining means monitors the usage state of the telephone circuit. For example, the talking determining means determines whether the usage state of the telephone circuit is the talking state on the basis of states of SS supplied from the exchange and SR supplied from the telephone circuit.

The changeover connection means corresponds to a switch for conducting the changeover connection of the pseudo echo path with the echo cancel circuit. The changeover connection means transfers the transmit signal to the telephone circuit via the echo cancel circuit, or transfers the transmit signal to the telephone circuit without passing it through the echo cancel circuit.

The control means controls the changeover connection means located between the pseudo echo path and the echo cancel circuit on the basis of a result of the determining conducted by the talking determining means. For example, if the talking determining means judges the usage state of the telephone circuit to be the talking state, the control means controls the changeover connections so as to connect the pseudo echo path with the echo cancel circuit and transfer the transmit signal to the telephone circuit via the echo cancel circuit.

In the echo canceler according to the second aspect of the present invention, if the usage state of the telephone circuit is judged to be a talking state, then the pseudo echo path is connected with the echo cancel circuit, and the transmit signal is transferred to the telephone circuit via the echo cancel circuit. In other words, at the time of call origination when the usage state of the telephone circuit is not the talking state, the PB signal which is the transmit signal is transferred to the telephone circuit without being passed through the echo cancel circuit. In addition to the above described effect of the echo canceler according to the first aspect, therefore, it becomes possible to certainly prevent the echo cancel circuit from degrading the signal quality of the PB signal.

An echo canceler according to a third aspect of the present invention is an echo canceler for suppressing an echo of a receive signal contained in a transmit signal directed to a telephone circuit and transferring the transmit signal subjected to echo suppression to the telephone circuit, characterized in that the echo canceler comprises: an echo cancel circuit for generating a pseudo echo on the basis of the receive signal supplied from the telephone circuit and the echo of the receive signal, subtracting the pseudo echo from the transmit signal directed to the telephone circuit, and transferring the transmit signal subjected to echo suppression to the telephone circuit; talking determining means for determining whether a usage state of a telephone circuit is a talking state; changeover connection means for conducting changeover connection of the telephone circuit with the echo cancel circuit; and control means responsive to judging in the talking determining means the usage state of the telephone circuit to be the talking state, for controlling the changeover connection means so as to connect the echo cancel circuit with the telephone circuit in order to transfer the transmit signal to the telephone circuit via the echo cancel circuit.

As for the same components as those included in the echo cancelers according to the first and second aspects, description of the configuration and operation will be omitted.

The changeover connection means corresponds to a switch for conducting the changeover connection of the telephone circuit with the echo cancel circuit. The changeover connection means transfers the transmit signal to the telephone circuit via the echo cancel circuit, or transfers the transmit signal to the telephone circuit without passing it through the echo cancel circuit.

The control means controls the changeover connection means located between the echo cancel circuit and the telephone circuit on the basis of a result of the determining conducted by the talking determining means. For example, if the talking determining means judges the usage state of the telephone circuit to be the talking state, the control means controls the changeover connections of the telephone circuit with the echo cancel circuit and transfer the transmit signal to the telephone circuit via the echo cancel circuit.

In the echo canceler according to the third aspect of the present invention, therefore, if the usage state of the telephone circuit is judged to be a talking state, then the pseudo echo path is connected with the echo cancel circuit, and the transmit signal is transferred to the telephone circuit via the echo cancel circuit. In other words, at the time of call origination when the usage state of the telephone circuit is not the talking state, the PB signal which is the transmit signal is transferred to the telephone circuit without being passed through the echo cancel circuit. Therefore, it becomes possible to certainly prevent the echo cancel circuit from degrading the signal quality of the PB signal.

DETAILED DESCRIPTION OF THE INVENTION

Hereafter, echo canceler systems shown in the embodiments of the present invention will be described by referring to drawing.

First Embodiment

Figure 1:
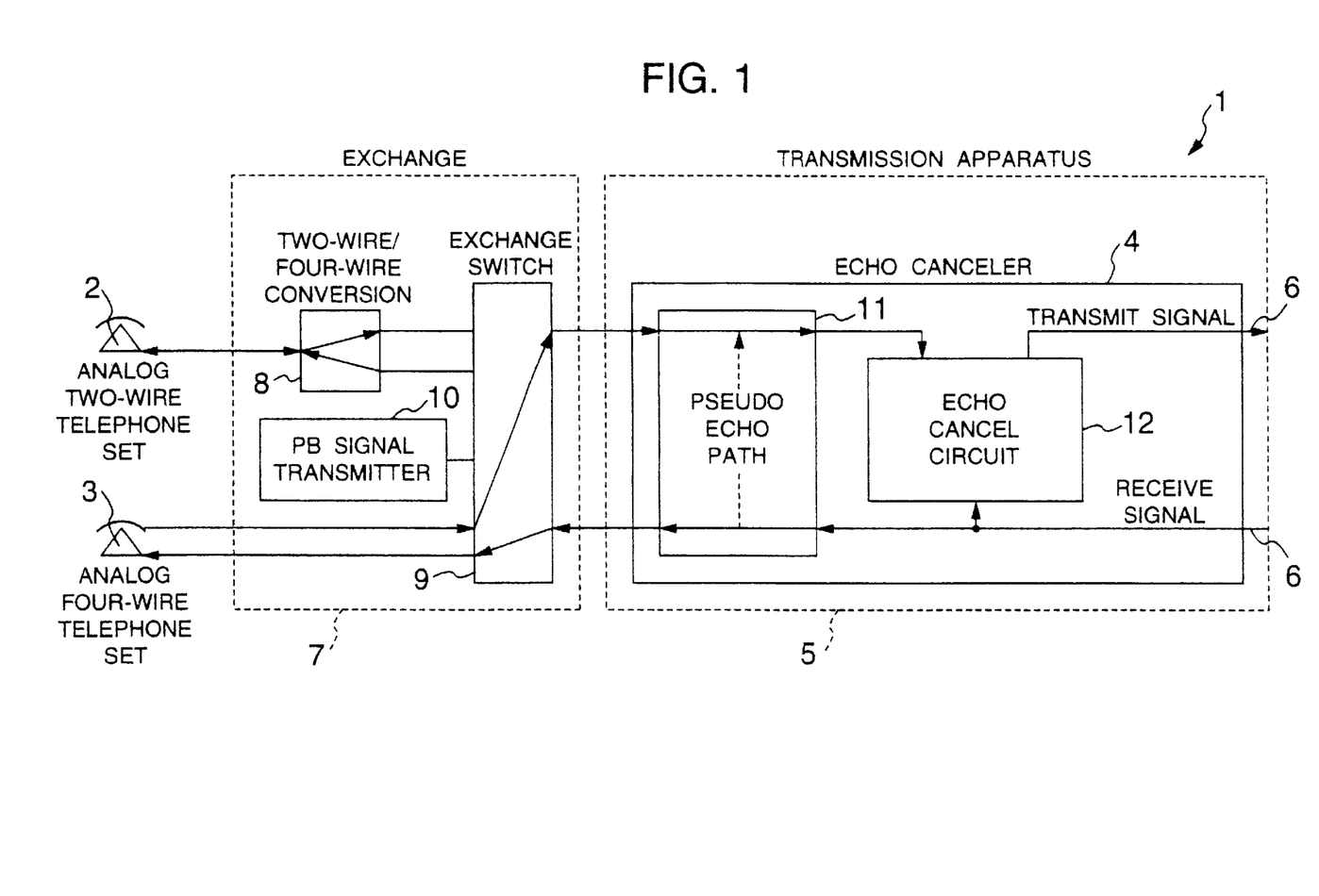
FIG. 1 is a block diagram showing the schematic configuration of the inside of an echo canceler system shown in a first embodiment of an echo canceler according to the present invention.
Figure 2:
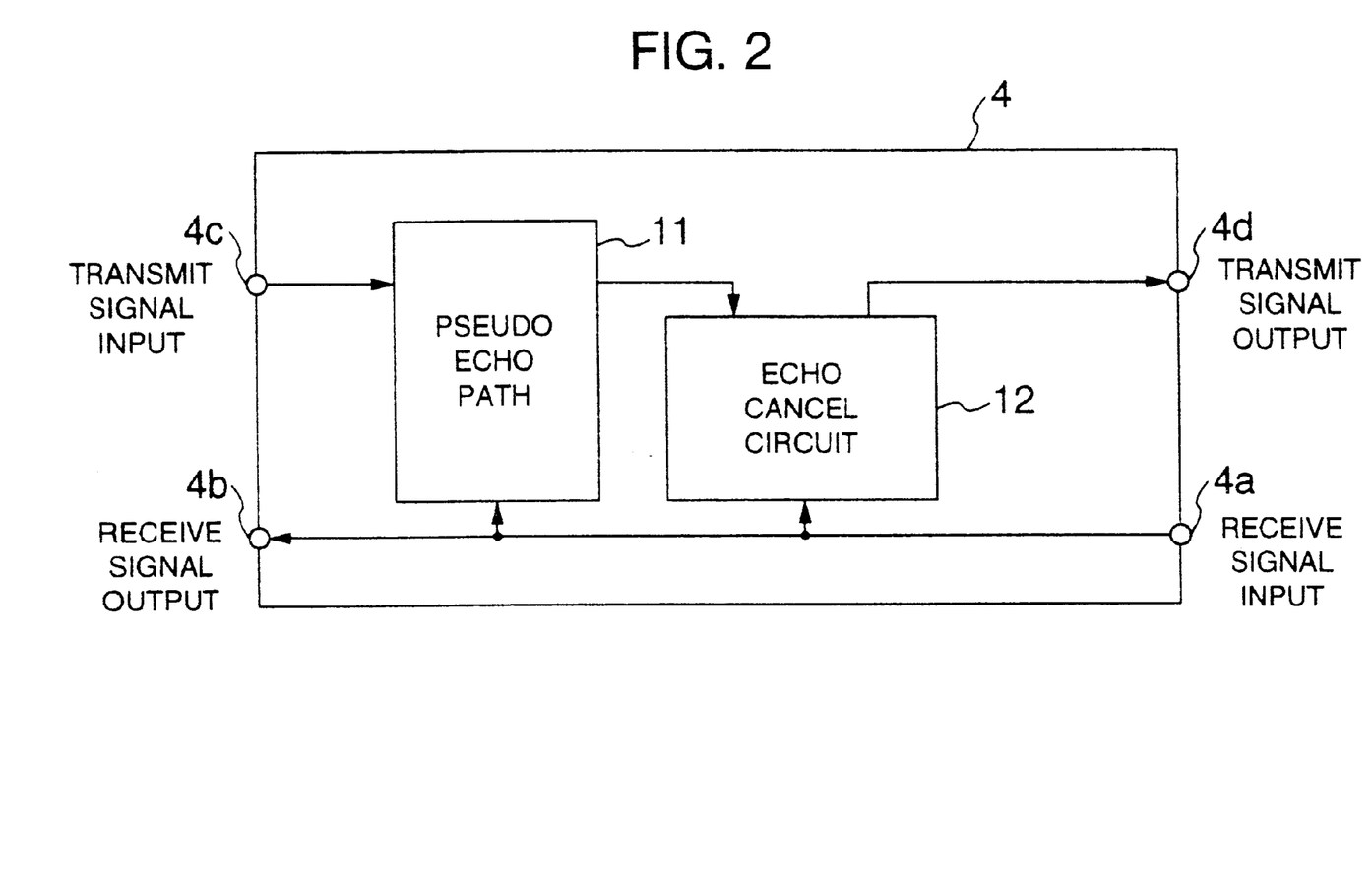
FIG. 2 is a block diagram showing the schematic configuration of the inside of an echo canceler which is a main part of the first embodiment.

FIG. 1 is a block diagram showing the schematic configuration of the inside of an echo canceler system shown in a first embodiment. FIG. 2 is a block diagram showing the schematic configuration of the inside of an echo canceler which is a main part of an echo canceler system shown in the first embodiment.

An echo canceler system 1 shown in FIG. 1 includes an analog two-wire telephone set 2, an analog four-wire telephone set 3, a transmission apparatus 5 having an echo canceler 4, and an exchange 7 for conducting exchange and connection for the analog two-wire telephone set 2, the analog four-wire telephone set 3, and telephone circuits 6 via the transmission apparatus 5.

Within this exchange 7, there are included a two-wire/four-wire conversion unit 8 connected to the analog two-wire telephone set 2 to conduct mutual two-wire/four-wire conversion for the transmit and receive signals, an exchange switch 9 for conducting switching connection among the two-wire/four-wire conversion unit 8, the analog four-wire telephone set 3, and the transmission apparatus 5, and a PB signal transmitter 10 for transmitting a PB signal obtained from the analog two-wire telephone set 2 or the analog four-wire telephone set 3 to a circuit side exchange.

As shown in FIG. 2, the echo canceler 4 included in the transmission apparatus 5 includes a receive signal input terminal 4a connected to the telephone circuit 6 to input a receive signal, a receive signal output terminal 4b connected to the exchange 7 to a output the receive signal, a transmit signal input terminal 4c connected to the exchange 7 to input a transmit signal, a transmit signal output terminal 4d connected to the telephone circuit 6 to output the transmit signal, a pseudo echo path 11 for attenuating the receive signal obtained from the receive signal input terminal 4a, delaying the receive signal thus attenuated, and adding the receive signal thus delayed to the transmit signal, and an echo cancel circuit 12 for suppressing an echo contained in the transmit signal and transferring the transmit signal thus subjected to echo suppression to the telephone circuit 6.

The echo cancel circuit 12 estimates a transfer function of a pseudo echo path 11 on the basis of the receive signal obtained from the telephone circuit 6 and an echo of the receive signal, generates a pseudo echo on the basis of a value thus estimated and the receive signal, subtracts this pseudo echo from the transmit signal passed through the pseudo echo path 11, and thereby transfers the transmit signal subjected to echo suppression to the telephone circuit 6.

Operation of the echo canceler system 1 shown in the first embodiment will now be described.

For example, in the case where the exchange 7 has connected the analog four-wire telephone set 3 to the transmission apparatus 5, the echo cancel circuit 12 estimates the transfer function of the pseudo echo path 11. Even if the echo cancel circuit 12 falsely judges the current state not to be a double talk state in spite of the double talk state, the influence over the speech quality of the transmit signal is slight because the pseudo echo path 11 exists.

Furthermore, in the case where the exchange 7 has connected the analog two-wire telephone set 2 with the transmission apparatus 5, the echo cancel circuit 12 estimates the transfer function of the echo path between the two-wire/four-wire conversion unit 8 and the pseudo echo path 11. Even if the echo cancel circuit 12 falsely judges the current state not to be a double talk state in spite of the double talk state, the influence over the speech quality of the transmit signal is slight because the pseudo echo path 11 exists.

According to the first embodiment, there is provided the pseudo echo path 11, and the echo cancel circuit 12 estimates the transfer function of the pseudo echo path 11 on the basis of the receive signal obtained from the telephone circuit 6 and the echo of the receive signal, generates a pseudo echo on the basis of a value thus estimated and the receive signal, and subtracts this pseudo echo from the transmit signal. If the echo canceler system is applied to a telephone circuit 6 having no echo path and even if the double talk state is caused, therefore, the estimated value of the transfer function of the pseudo echo path 11 is not largely disturbed by false judgment of double talk because the pseudo echo path 11 is always present. As a result, the speech quality degradation of the transmit signal can be certainly improved.

Second Embodiment

Figure 3:
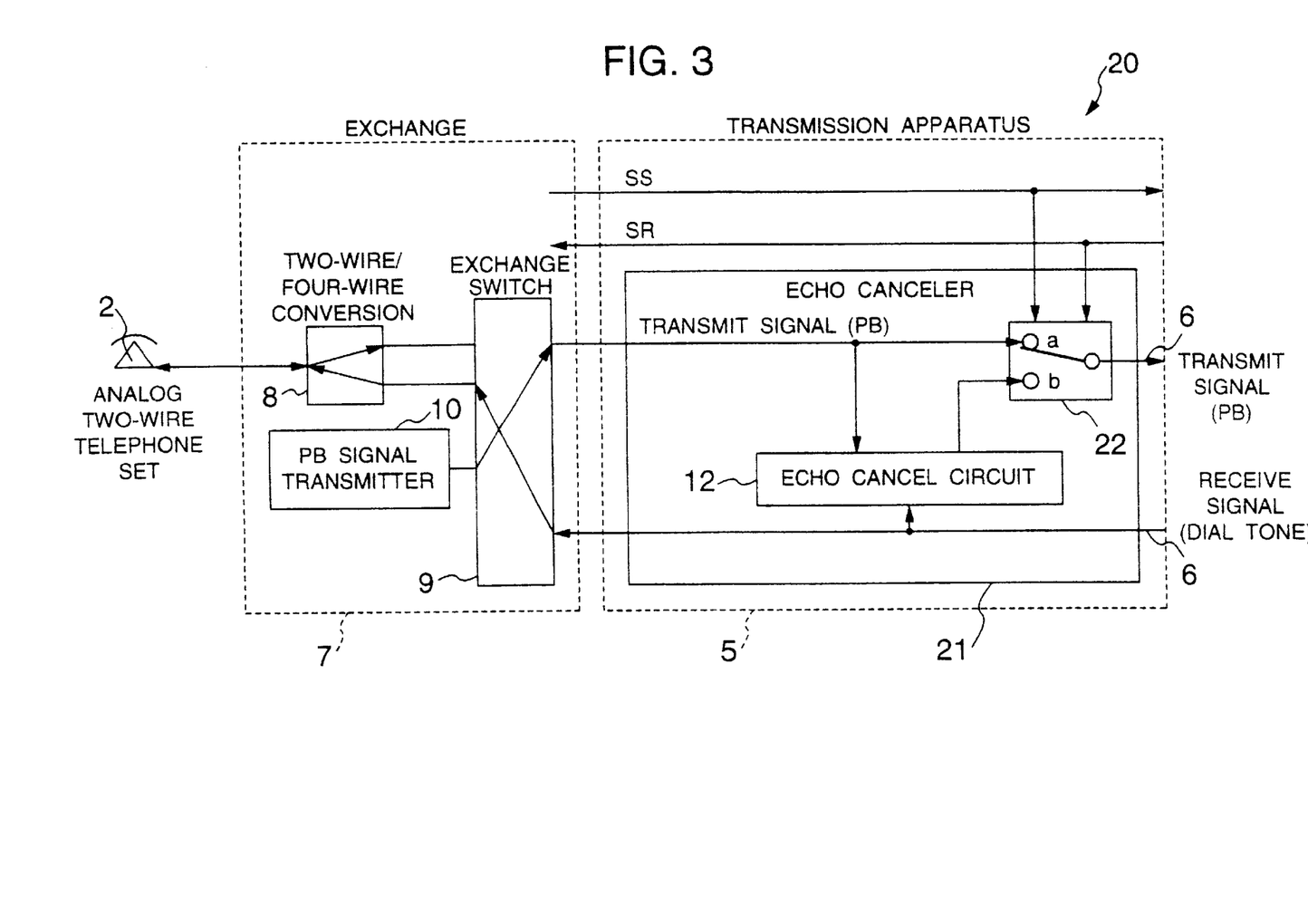
FIG. 3 is a block diagram showing the schematic configuration of the inside of an echo canceler system shown in a second embodiment of an echo canceler according to the present invention.
Figure 4:
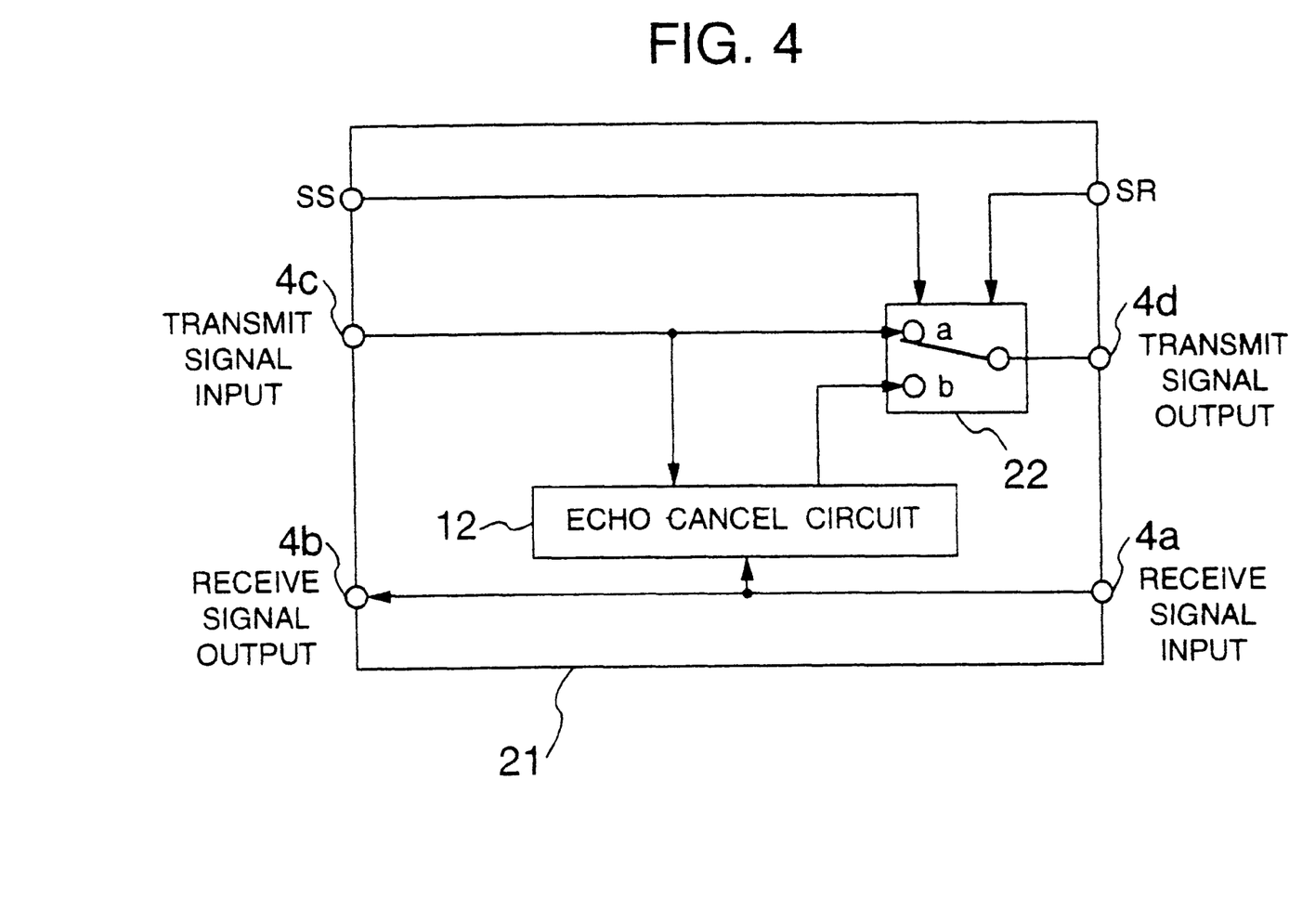
FIG. 4 is a block diagram showing the schematic configuration of the inside of an echo canceler which is a main part of the second embodiment.

An echo canceler system shown in a second embodiment will now be described. FIG. 3 is a block diagram showing the schematic configuration of the inside of an echo canceler system shown in a second embodiment. FIG. 4 is a block diagram showing the schematic configuration of the inside of an echo canceler which is a main part of an echo canceler system shown in the second embodiment.

The same components as those of the echo canceler system 1 shown in FIG. 1 are denoted by like numerals, and description of their configuration and operation will be omitted.

An echo canceler system 20 shown in FIG. 3 is characterized in that the pseudo echo path 11 is not provided within an echo canceler 21, but the echo canceler 21 has a switch 22 for conducting changeover connection of the telephone circuit 6 with an echo cancel circuit 12.

Operation of the echo canceler system 20 shown in the second embodiment will now be described.

For example, when originating a call from the analog two-wire telephone set 2 to a telephone set of the other party, the analog two-wire telephone set 2 obtains a dial tone from an exchange of the other party as a result of off-hook of the analog two-wire telephone set 2. In this state, a calling subscriber of the analog two-wire telephone set 2 depresses a dial number of a telephone set of the other party. In the case where the dial signaling system is the PB system, the analog two-wire telephone set 2 transmits the depressed PB signal to an exchange 7. The exchange 7 temporarily stores this PB signal and, in addition, transmits the PB signal to a transmission apparatus 5 via a PB signal transmitter 10.

Until the telephone set of the other party is brought to the answer or off-hook state, neither SS from the exchange 7 nor SR from the telephone circuit 6 passes into a make state. Until the telephone set of the other party answers, therefore, the switch 22 is positioned on a "a" terminal side. In the case where the switch 22 is positioned on the "a" terminal side, a transmit signal obtained from the transmit signal input terminal 4c is transferred to a telephone circuit of the telephone set of the other party without being passed through the echo cancel circuit 12. At this time, the echo cancel circuit 12 does not exert an influence upon the speech quality of the transmit signal until the telephone set of the other party is brought to the answer or off-hook state, i.e., the usage state of the telephone circuit 6 becomes the talking state.

If the telephone set of the other party is brought to the answer or off-hook state, then both SS from the exchange 7 and SR from the telephone circuit 6 pass into the make state. As a result, the switch 22 is connected with a "b" terminal side.

In the case where the switch 22 is positioned on the "b" terminal side, the transmit signal obtained from the transmit signal input terminal 4c is transferred to the telephone circuit of the telephone set of the other party via the echo cancel circuit 12. At this time, the echo cancel circuit 12 suppresses the echo of the receive signal contained in the transmit signal by answering or off-hook of the telephone set of the other party, and consequently the usage state becoming the talking state.

According to the second embodiment, if the usage state of the telephone circuit 6 is judged to be a talking state, then the echo cancel circuit 12 is connected with the telephone circuit 6, and the transmit signal is transferred to the telephone circuit 6 via the echo cancel circuit 12. In other words, at the time of call origination when the usage state of the telephone circuit 6 is not the talking state, the PB signal which is the transmit signal is transferred to the telephone circuit 6 without being passed through the echo cancel circuit 12. Therefore, the echo cancel circuit 12 does not affect the signal quality of the PB signal. It thus becomes possible to avoid problems such as uncompleted connection or misconnection caused by the quality degradation of the PB signal.

In the echo canceler according to the first aspect of the present invention having the above described configuration, there is provided the pseudo echo, and the echo canceler estimates the transfer function of the pseudo echo path on the basis of the receive signal obtained from the telephone circuit and the echo of the receive signal, generates a pseudo echo on the basis of a value thus estimated and the receive signal, and subtracts this pseudo echo from the transmit signal. If the echo canceler is applied to a telephone circuit having no echo path and even if the double talk state is caused, therefore, the estimated value of the transfer function of the pseudo echo path is not largely disturbed by false judgment of double talk, because the pseudo echo path is always present. As a result, the speech quality degradation of the transmit signal can be certainly improved.

In the echo canceler according to the second aspect of the present invention, if the usage state of the telephone circuit is judged to be a talking state, then the pseudo echo path is connected with the echo cancel circuit, and the transmit signal is transferred to the telephone circuit via the echo cancel circuit. In other words, at the time of call origination when the usage state of the telephone circuit is not the talking state, the PB signal which is the transmit signal is transferred to the telephone circuit without being passed through the echo cancel circuit. Therefore, it becomes possible to certainly prevent the echo cancel circuit from degrading the signal quality of the PB signal.

In the echo canceler according to the third aspect of the present invention, if the usage state of the telephone circuit is judged to be a talking state, then the echo cancel circuit is connected with the telephone circuit, and the transmit signal is transferred to the telephone circuit via the echo cancel circuit. In other words, at the time of call origination when the usage state of the telephone circuit is not the talking state, the PB signal which is the transmit signal is transferred to the telephone circuit without being passed through the echo cancel circuit. Therefore, it becomes possible to certainly prevent the echo cancel circuit from degrading the signal quality of the PB signal.

What is claimed is:

1. An echo canceler comprising:
   (a) an echo generation circuit that (i) attenuates and delays a receive signal to obtain a delayed attenuated receive signal that constitutes a first echo component and (ii) adds the first echo component to an original transmit signal comprising a desired transmit signal and one of (i) a second echo component introduced by an external echo source and (ii) no second echo component introduced by an external echo source, to obtain a combined transmit signal; and
   (b) an echo cancel circuit that suppresses echo in said combined transmit signal and transfers the combined transmit signal having suppressed echo to an external telephone circuit by (i) generating a pseudo echo based on said receive signal and said combined transmit signal, (ii) subtracting said pseudo echo from said combined transmit signal to suppress said first echo component and said second echo component when said second echo component is present in said original transmit signal and (iii) transmitting said combined transmit signal having said pseudo echo subtracted therefrom to the external telephone circuit.

* * * * *